Figure 1:
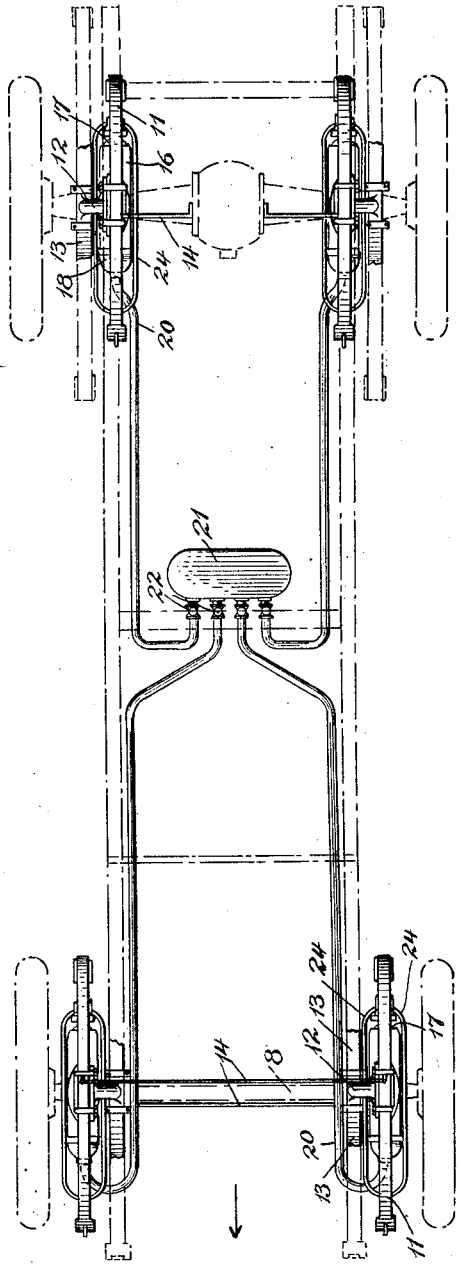

W. SELLENGER.
PNEUMATIC SUSPENSION FOR VEHICLES.
APPLICATION FILED JUNE 24, 1912.

1,091,250.

Patented Mar. 24, 1914.

2 SHEETS—SHEET 1.

Witnesses:
Gustave R. Thompson
Fred White

Inventor:
William Sellenger,
By his Attorneys:
Fraser, Turk & Myers

W. SELLENGER.
PNEUMATIC SUSPENSION FOR VEHICLES.
APPLICATION FILED JUNE 24, 1912.
1,091,250.
Patented Mar. 24, 1914.
2 SHEETS—SHEET 2.
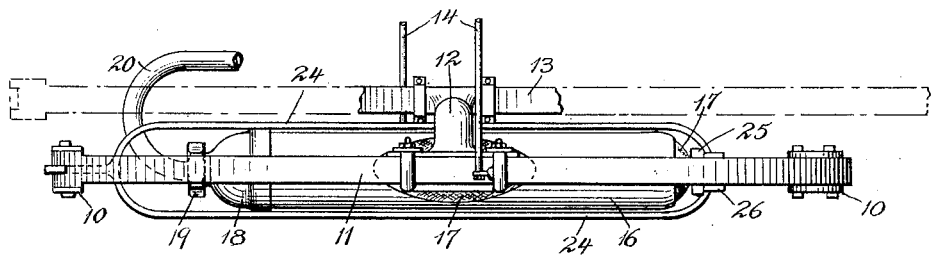
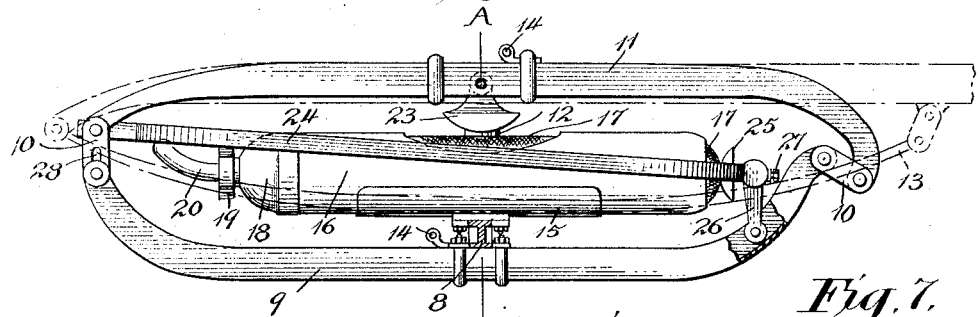
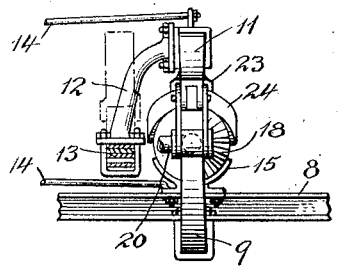
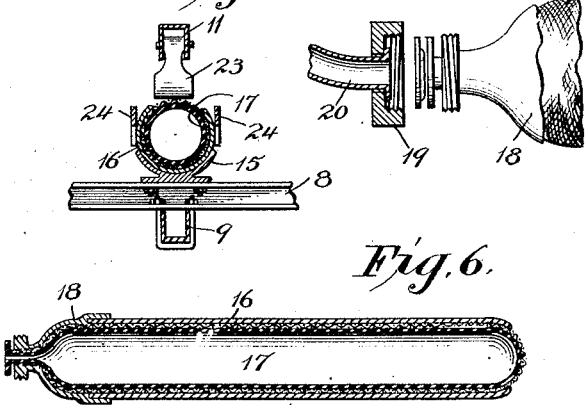
Witnesses:
Gustave R. Thompson
Fred White
Inventor:
William Sellenger,
By his Attorneys:
Fraser, Turk & Myers

UNITED STATES PATENT OFFICE.

WILLIAM SELLENGER, OF RICHMOND, VICTORIA, AUSTRALIA.

PNEUMATIC SUSPENSION FOR VEHICLES.

1,091,250. Specification of Letters Patent. Patented Mar. 24, 1914.

Application filed June 24, 1912. Serial No. 705,514.

*To all whom it may concern:*

Be it known that I, WILLIAM SELLENGER, of 286 Church street, Richmond, in the State of Victoria, Commonwealth of Australia, mechanic, have invented certain new and useful Improvements in Pneumatic Suspension for Vehicles, of which the following is a specification.

My invention has been devised for the purpose of taking up the shocks upon the wheels of vehicles and applies more particularly to the motor driven types, though it can be used with effect upon other conveyances such for instance as horse drawn wagonettes, hansoms etc.

In carrying the invention into effect, I hold up the vehicle springs, which heretofore have been rigidly held upon the wheel axles, in brackets that are upon flexible supports conveniently secured to the axles of the vehicle. On each axle are also pneumatic cushions, of which there will be one for each wheel and spring, and there are bearings to each cushion as will be hereinafter described. But in order to fully understand the invention reference is made to the accompanying drawings, in which—

Figure 1 is a plan of the chassis of a motor car, which I have selected as the best means for illustrating my invention, showing the general arrangement of parts which constitute the same. Fig. 2 is a side elevation of one side of the device, the chassis being shown in dotted lines in this and the previous figure. Fig. 3 is a plan of the same, and Fig. 4 a front elevation. Fig. 5 is a section on the line A—B, Fig. 2. Fig. 6 shows the air chamber in longitudinal section, and Fig. 7 is a longitudinal section of the air pipe attachment means slightly enlarged.

Attached to each axle 8 are stout channel iron straps or beams 9 to which are loosely articulated, through short links 10, other and like members 11. To each upper beam 11 is rigidly attached a hanger 12 that extends downward and embraces in its support the vehicle spring 13 that is thereby kept clear above the axle 8. Suitable tie rods 14 steady the elliptically arranged beams laterally and prevent side play.

Resting upon and secured to the axles are cradles 15 in which lie cylindrical metal chambers 16 each containing a fabric covered pneumatic tube 17. Part of the chamber at the top and at one end is removed to expose the pneumatic member for the purpose hereinafter explained, and the other end is provided with a removable cap 18 in which is a bayonet joint and a cap and liner 19 that holds the air tube 20 which is the medium through which the tube 17 is kept supplied from a common air container 21. The latter will be stowed in a convenient part of the vehicle and each pneumatic receptacle 17 will be in direct communication therewith through the pipes 20 and cocks 22 that will be capable of being operated from the seat of the car as occasion requires. A pump may be attached to the air reservoir 21 for keeping the air therein up to the required pressure.

Pivotally mounted on each beam 11 is a curved bearing piece 23 that rests upon the tube 17. Upon these pieces the weight of the frame of the car or vehicle will bear vertically. The piece 23 is loosely attached to its support so that when the relative positions of the beams alter owing to the motion of the vehicle and the piece presses upon the tube, it would roll thereon thereby minimizing the friction. Also pivotally attached to the forward end of the strap 11 is a yoke 24 that passes rearward on each side of the pneumatic tube chamber and terminates behind another curved bearing piece 25 that is in contact with tube 17. Said piece 25 is mounted upon a knuckle 26 loosely pivoted in the channel iron 9. The yoke 24 thus connects the irons 9 and 11 longitudinally and with the knuckle which is fitted with an adjustment screw 27 for the purpose of setting the bearing plate to properly contact with the pneumatic tube, serves to strengthen the whole and to hold the parts together in their bearing upon the air tube.

If the car moves in the direction of the arrow in Fig. 1 over an uneven surface, the tendency of the irons 9 and 11 will be to come together while the tube 17 will take up the weight and the shocks through the pieces 23 and 25. Should the wheels meet with an extraordinary obstruction such as a deep rut or a stone the extra jolt will be taken partly by the tube and partly by the springs 13 that are hung upon the tube. In this case the shock will be transmitted from the wheel through the pneumatic cushion 17, bearing members 23 and 25, iron 11 and hanger 12 to the springs 13. Much of the shock will, however, be absorbed in transmission by the cushion.

My reasons for incasing the pneumatic tube in a metal container are for the protection of the tube and to render it easier of fixing in the cradle.

There will be a pressure gage on the air reservoir 21 and the pressure therein will also be the pressure in the tubes 17. Should any tube leak it may be readily cut out by closing all the cocks 22 and observing the defective part which if not cured will allow its spring which normally rests upon the tube in the hanger 12, to be let down to rest upon the car axle.

The irons 9 and 11 are articulated through the links 10, the forward one being provided with a slot 28 which will give the necessary clearance in vertical shocks.

There will be a complete set of parts to each wheel and the arrangement of the same is such that great longitudinal flexibility is obtained while vertical and longitudinal shocks are absorbed by the pneumatic and the ordinary springs.

I propose to utilize my invention on pneumatic tired cars and vehicles, but it will also be possible to employ it with solid tired cars and conveyances owing to its efficiency in taking up and absorbing the shocks imparted to the car through the wheels rolling upon uneven surfaces.

Having now described my invention what I claim as new and desire to secure by Letters Patent is:—

1. In a vehicle, the combination of an axle, a spring, and a cushion interposed between said spring and axle and adapted to absorb shocks transmitted by said axle, an arm attached to said spring and an arm attached to said axle, and link connections between said arms, one of said links being slotted, adapted to permit vertical play between said axle and spring.

2. In a vehicle, the combination of an axle, a vehicle body and a cushion interposed between said axle and vehicle body and adapted to absorb shocks transmitted by said axle, and a connection between said axle and vehicle body, said connection comprising semi-elliptical arms having a connection between them permitting vertical play of said axle and vehicle body, an abutment pivoted upon one of said arms, and a connecting-piece attached to the other of said arms, adapted to move said abutment into contact with said cushion, when relative movement takes place between said arms.

3. In a vehicle, the combination of an axle, a spring, and a cushion interposed between said spring and axle and adapted to absorb shocks transmitted by said axle, and a connection between said axle and spring, said connection comprising semi-elliptical arms having a connection between them permitting vertical play of said axle and vehicle body, and a hanger attached to the upper of said arms and projecting downwardly on one side of the parts, and adapted to be connected to said spring.

4. In a vehicle, the combination of an axle, a vehicle body and a cushion interposed between said axle and vehicle body and adapted to absorb shocks transmitted by said axle, and a connection between said axle and vehicle body, said connection comprising semi-elliptical arms having a connection between them permitting vertical play of said axle and vehicle body, an abutment pivoted upon one of said arms and a yoke pivoted upon the other of said arms and connected to said abutment and adapted to move said abutment into contact with said cushion when relative movement takes place between said arms.

In witness whereof, I have hereunto signed my name in the presence of two subscribing witnesses.

WILLIAM SELLENGER.

Witnesses:
P. M. NEWTON,
M. ALLAN.